(12) United States Patent
Hamabe

(10) Patent No.: US 8,107,990 B2
(45) Date of Patent: *Jan. 31, 2012

(54) APPARATUS AND METHOD FOR TRANSMISSION POWER BALANCE ADJUSTMENT IN A MOBILE CELLULAR SYSTEM

(75) Inventor: Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 441 days.

This patent is subject to a terminal disclaimer.

(21) Appl. No.: 12/353,806

(22) Filed: Jan. 14, 2009

(65) Prior Publication Data

US 2009/0124278 A1 May 14, 2009

Related U.S. Application Data

(63) Continuation of application No. 11/904,068, filed on Sep. 26, 2007, now Pat. No. 7,565,164, which is a continuation of application No. 11/214,322, filed on Aug. 29, 2005, now Pat. No. 7,409,223, which is a continuation of application No. 09/891,082, filed on Jun. 25, 2001, now Pat. No. 6,978,150.

(30) Foreign Application Priority Data

Jun. 25, 2000 (JP) .................................. 2000-198059

(51) Int. Cl.
*H04B 1/00* (2006.01)
*H04Q 11/12* (2006.01)
*H04B 7/00* (2006.01)

(52) U.S. Cl. .................... 455/522; 455/69; 455/127.1
(58) Field of Classification Search ............... 455/522, 455/69, 127.1
See application file for complete search history.

(56) References Cited

U.S. PATENT DOCUMENTS

| | | | | |
|---|---|---|---|---|
| 5,893,035 | A * | 4/1999 | Chen | 455/522 |
| 5,982,760 | A | 11/1999 | Chen | |
| 6,085,108 | A * | 7/2000 | Knutsson et al. | 455/522 |
| 6,144,861 | A * | 11/2000 | Sundelin et al. | 455/522 |
| 6,334,047 | B1 * | 12/2001 | Andersson et al. | 455/69 |
| 6,594,499 | B1 * | 7/2003 | Andersson et al. | 455/522 |
| 6,931,257 | B2 * | 8/2005 | Shahidi et al. | 455/522 |
| 7,245,597 | B2 | 7/2007 | Grilli et al. | |
| 7,826,802 | B2 | 11/2010 | Stein et al. | |

FOREIGN PATENT DOCUMENTS

WO    WO 99/52310    10/1999

OTHER PUBLICATIONS

Extended European Search Report dated Oct. 12, 2010.
United States Official Action dated Jul. 5, 2011 from related application U.S. Appl. No. 12/353,791.

* cited by examiner

*Primary Examiner* — Tilahun B Gesesse
(74) *Attorney, Agent, or Firm* — Scully, Scott, Murphy & Presser, P.C.

(57) ABSTRACT

A transmission power control system can establish synchronization by matching adjustment start timings while repeating adjustment periods even when start timings of transmission power balance adjustment are different due to fluctuation of transmission delay of control message from the control station to base station, and can increase circuit capacity by establishing balance of transmission powers between the base stations. In the transmission power control system the base station comprises control means for controlling initiation of a balance adjustment period for performing the balance adjustment from a frame number determined on the basis of frame number of the balance adjustment period.

8 Claims, 9 Drawing Sheets

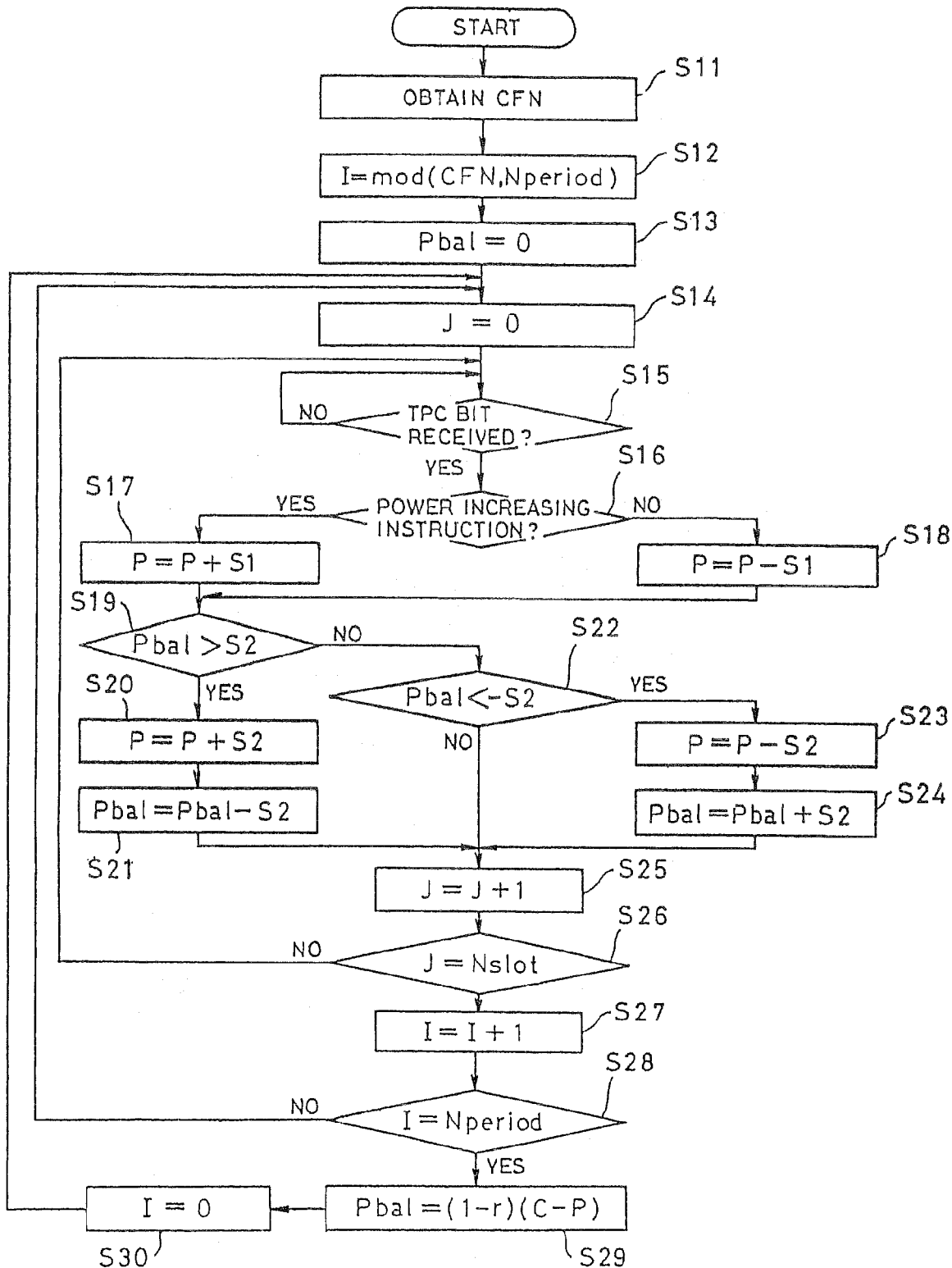

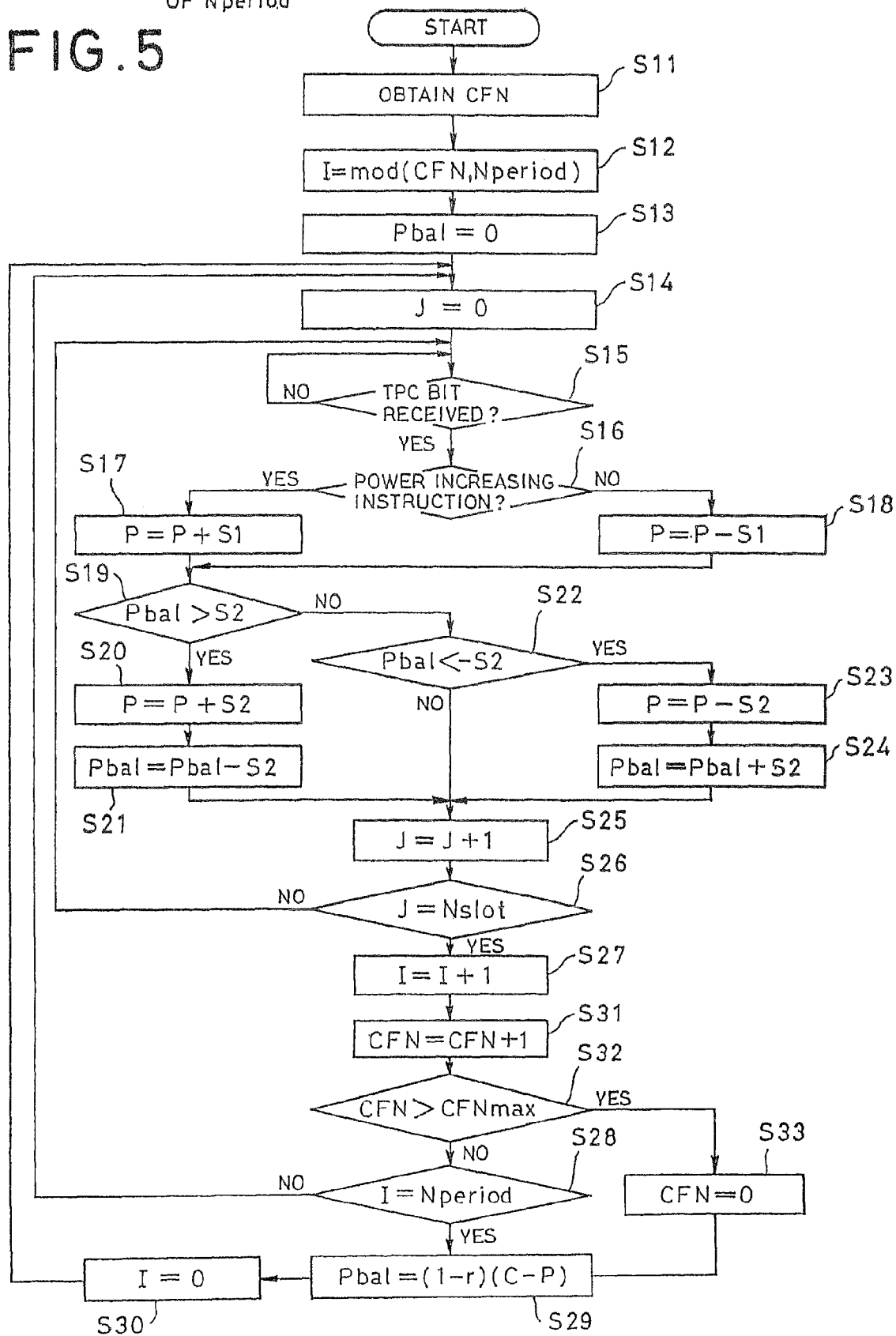
FIG.5 IN CASE WHERE CFNmax IS NOT NECESSARILY INTEGER MULTIPLEX OF Nperiod

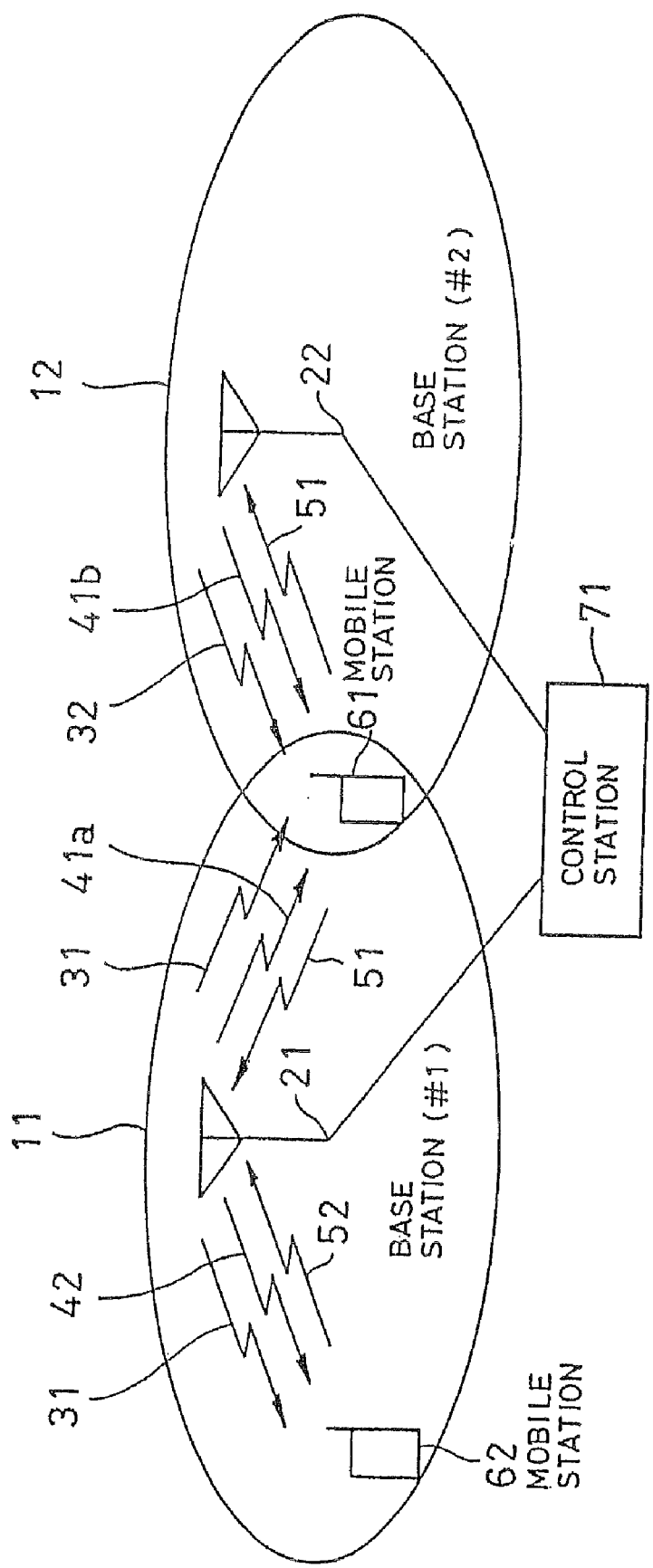
FIG.6 - PRIOR ART -
EXAMPLE OF SYSTEM CONSTRUCTION

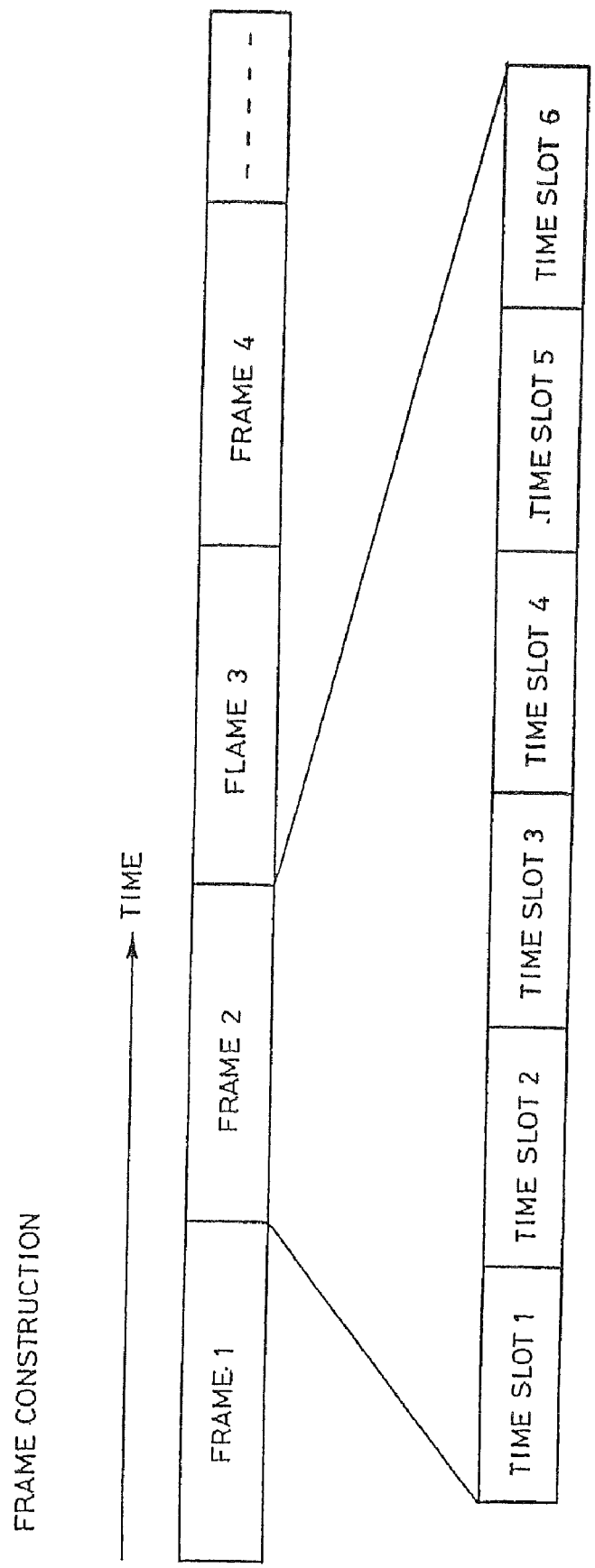
FIG. 7 - PRIOR ART -

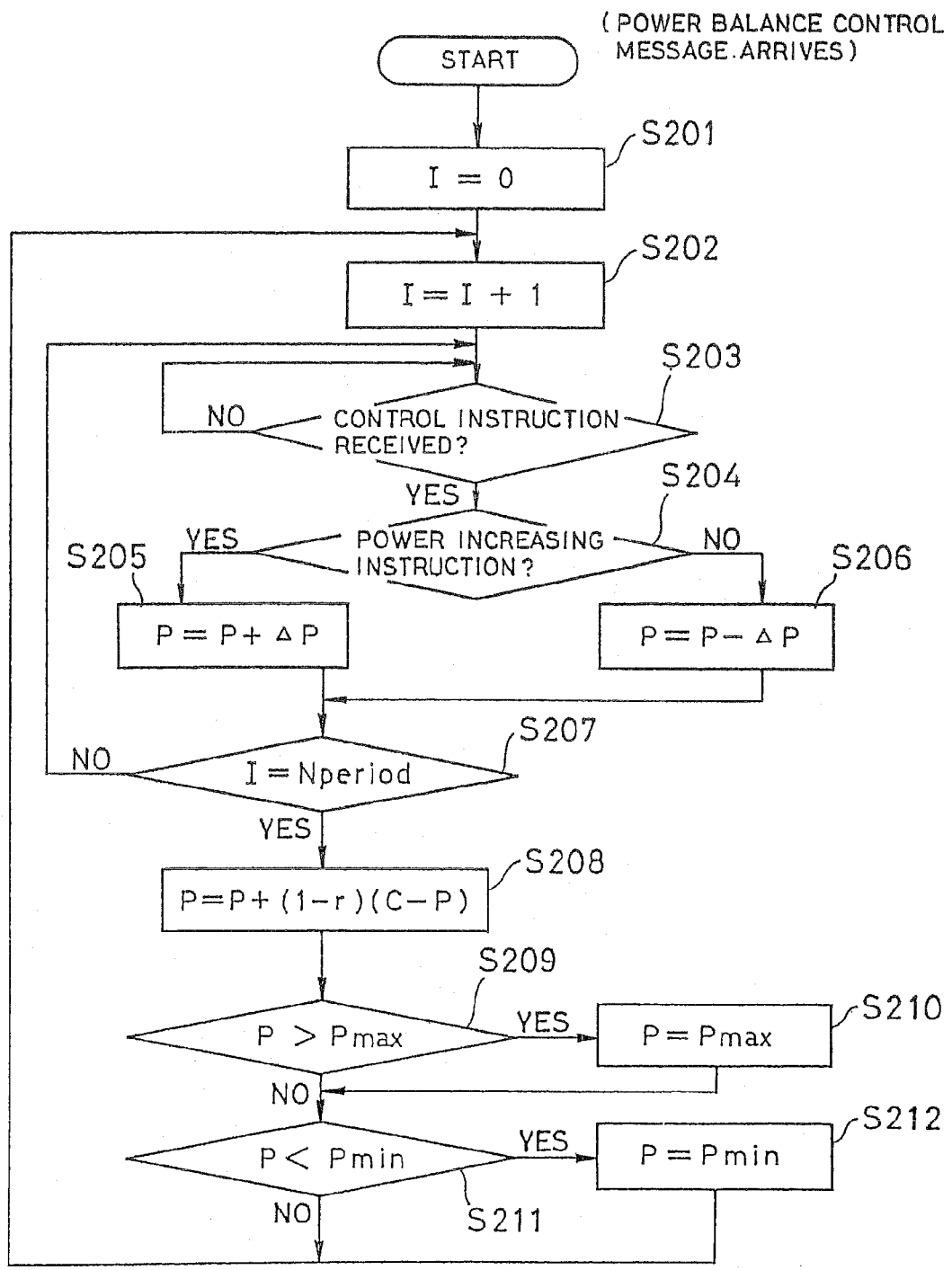

FIG. 9A  - PRIOR ART -
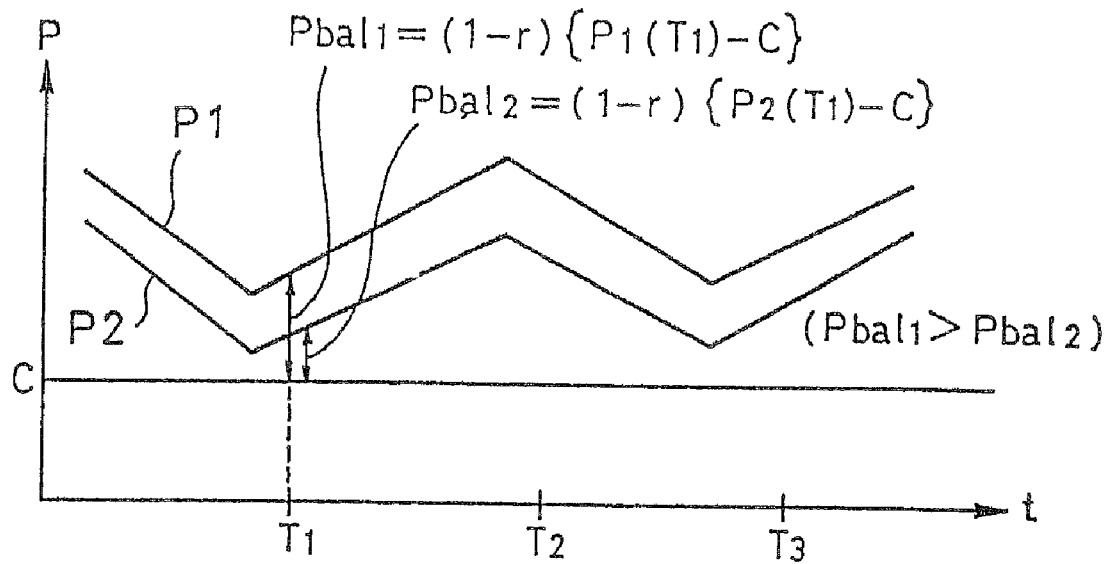
FIG. 9B  - PRIOR ART -
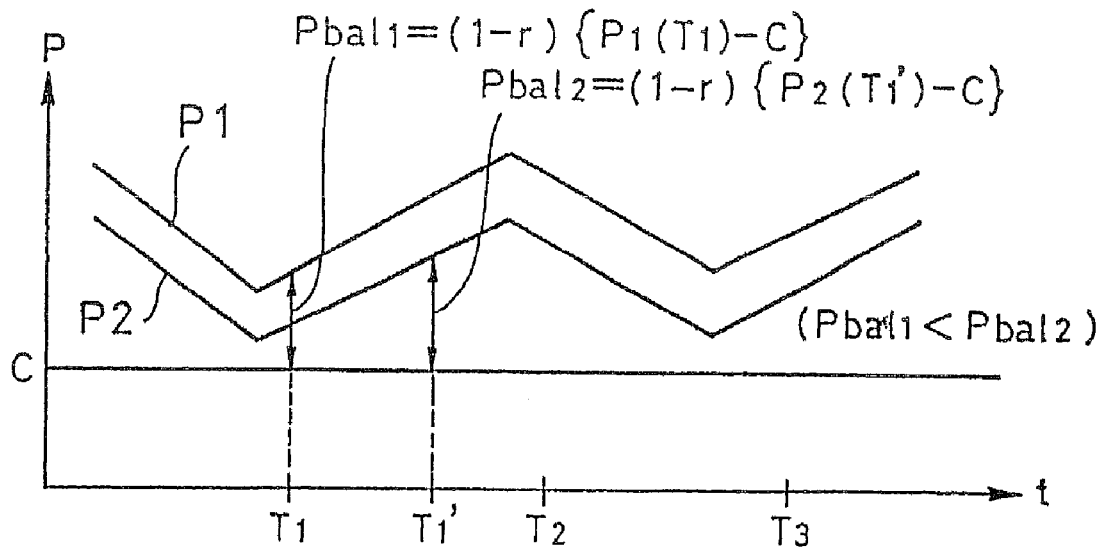

APPARATUS AND METHOD FOR TRANSMISSION POWER BALANCE ADJUSTMENT IN A MOBILE CELLULAR SYSTEM

CROSS-REFERENCE TO RELATED APPLICATIONS

The present application is a continuation of co-pending U.S. patent application Ser. No. 11/904,068, filed on Sep. 26, 2007, which is a continuation, and claims benefit under 35 U.S.C. §120, of co-pending U.S. patent application Ser. No. 11/214,322, filed on Aug. 29, 2005, which is a continuation of U.S. Pat. No. 6,978,150 filed on Jun. 25, 2001 and issued Dec. 20, 2005, which claims priority under 35 U.S.C. §119 of Japanese Patent Application Number 2000-198059, filed 25 Jun. 2000, the complete disclosures of which are hereby incorporated by reference in their entirety for all purposes.

BACKGROUND OF THE INVENTION

1. Field of Invention

The present invention relates generally to a transmission power control system, a control method, a base station and a control station and a storage medium recording a control program. More particularly, the invention relates to a method for determining a balance adjustment start timing upon performing balance adjustment of a transmission power for one mobile station from a plurality of base stations at the occurrence of soft hand-over in cellular communication system.

2. Description of Related Art

In a code division multiplex cellular system, a plurality of channels use the same frequency, a reception power (desired wave power) of a signal at certain channel becomes an interference wave power to be jamming for other channels. Accordingly, in an uplink transmitted from a mobile station to a base station, when the desired wave power is greater than or equal to a predetermined value, interference wave power is increased to reduce capacity of the channel. In order to prevent this, it becomes necessary to strictly control the transmission power of the mobile station. The transmission power control in the uplink is performed in such a manner that the base station measures the desired wave power to compare with a target control value for transmitting a up control instruction for reducing a transmission power (hereinafter referred to as "up transmission power") of the uplink for the mobile station when the desired power is larger than the target control value, and for transmitting the up control instruction for increasing the up transmission power for the mobile station when the desired wave power is smaller than the target control value. Then, the mobile station increases or decreases the up transmission power according to the up control instruction. Transmission of the up control instruction in the transmission power control is performed using a downlink transmitting from the base station to the mobile station.

On the other hand, even in the downlink, by performing transmission power control so that a ratio between the desired wave power and the interference wave power becomes a predetermined amount to realize high channel capacity. In greater detail, in the transmission power control in the downlink, the mobile station measures a reception quality of the downlink to compare with a target control value for transmitting a down control instruction for reducing transmission power of the downlink (hereinafter referred to as "down transmission power") for the base station when the reception quality is higher than the target control value, and for transmitting down control instruction for increasing the down control power when the reception quality is lower than the target control value. Then, the base station increases or decreases the down transmission power according to the down control instruction.

However, in this method, when propagation loss from the mobile station to the base station is abruptly increased associating with movement of position of the mobile station, the base station cannot receive the down control instruction from the mobile station. At the same time, even in the mobile station, it can become impossible to receive the up control instruction from the base station. At this time, in the conventional method for only controlling transmission power of the downlink in the mobile station by down control instruction from the base station, when a condition where the propagation loss is increased, is continued, while the base station cannot receive the down control instruction from the mobile station, the base station does not increase the transmission power of the downlink. Therefore, even in the mobile station, it becomes impossible to receive the up control instruction from the base station. Thus, the up transmission power of the signal in the uplink is not increased to continue a condition where communication between the mobile station and the base station is interrupted.

On the other hand, in general, among signals received by the base station, a portion of user information, such as voice, data and so forth are encoded in such a manner that information having relatively long data length are encoded in a lump so that they can be accurately decoded by performing error correction and so forth even when reception error in a moment is caused. Even upon decoding, information having long data length can be decoded in a lump over a relatively long period.

However, during movement of the mobile station at high speed, when high speed transmission power control is performed for maintaining a reception quality constant following to high speed fading fluctuation in the propagation path, even if the user information can be decoded accurately, judgment of the control instruction has to be performed in a moment. Effect of error correction and so forth cannot be obtained in judgment of the control instruction to contain error relatively frequently.

Since error in judgment of such control instruction is caused in relation to increase and decrease of propagation loss, possibility of continuously causing propagation loss becomes relatively high. Then, when judgment error of the control instruction is continuously caused, the base station cannot control the down transmission power of the signal in the downlink according to the down control instruction from the mobile station to make it impossible to accurately receive the signal in the downlink in the mobile station. On the other hand, in this condition, even in the mobile station, since the up control instruction from the base station contained in the signal of downlink cannot receive, the up transmission power of the signal in the uplink is also become impossible to control. At this time, in the base station, among signals in uplink, error of judgment of the down control instruction can be caused frequently, and also, it becomes possible that the user information cannot receive accurately. Even in such case, a condition where communication between the base station and the mobile station is interrupted, is continued.

On the other hand, in the cellular system, when the mobile station moves between cells, there is a soft hand-over technology for switching channels between the cells with simultaneously setting the channels with a plurality of the base stations in the vicinity of the boundary between the cells. This technology is important in the cellular system employing the code division multiplexing system.

Transmission power control in uplink during execution of soft hand-over is important for enabling reception of all up control instructions of all base stations where the propagation loss in uplink potentially becomes minimum.

Therefore, a method for controlling the transmission power of the downlink to equalize the desired wave power from respective base stations in the mobile station, can be considered. However, in this method, since the base station having large propagation loss to the mobile station sets the down transmission power to be large correspondingly to increase interference wave and whereby to reduce capacity of the downlink. As a method for restricting reduction of the capacity of the downlink, there is a method for controlling the down transmission power of respective base stations to be equal to each other.

In this method, a reception power of the up control instruction from the base station having small propagation loss to the mobile station is greater than the reception power of the up control instruction from the base station having large propagation loss to the mobile station. When a difference of the propagation losses is large, probability of reception failure of the up control instruction from the base station having large propagation loss becomes high. In such case, the transmission power in the uplink is mainly controlled by up control instruction from the base station having small propagation loss. Therefore, no significant problem will be arisen. On the other hand, when the difference of the propagation losses is small, it is important to control the up transmission power according to both base stations. In such case, since respective up control instructions can be received at substantially equal power, probability of accurately receiving both up control instructions becomes high. Accordingly, for transmission power control of the uplink, all up control instructions from the base stations which potentially have minimum propagation loss of the uplink can be received.

On the other hand, during execution of soft hand-over, when large and small of the propagation loss from the mobile station to respective base stations is switched at high speed due to fading fluctuation or other cause, the base station having the minimum propagation loss performs transmission at any moment even without switching of the base stations to perform transmission to the mobile station at high speed. At this time, unless the down transmission power of the base stations are equal to each other, reception quality can be increased or decreased upon switching of the base station having the minimum propagation loss to easily cause degradation of the reception quality. However, when down transmission power of respective base stations are equal to each other, the reception quality can be maintained substantially constant even when the base stations having the minimum propagation loss is switched to improve reception quality by diversity effect.

In such transmission power control in downlink, the mobile station measures the reception quality of the downlink to compare with the target control value to transmit the down control instruction for reducing the down transmission power for the base station when the reception quality is higher than the target control value, and to transmit the down control instruction for increasing the down transmission power for the base station when the reception quality is lower than the target control value. During execution of soft hand-over, the down control instruction transmitted from the mobile station is received by a plurality of base stations. Then, respective base stations controls the down transmission power to increase or decrease according to the down control instruction. Accordingly, if the initial values of the down transmission power of respective base stations are mutually equal to each other, similar increase or decrease is repeated. If no error is contained in reception of down control instruction, down transmission power can be controlled with maintaining equal condition.

However, in this method, in the base station where the propagation loss to the mobile station becomes minimum, down control instruction from the mobile station can be received in substantially accurate. However, in the base station having relatively large propagation loss in transmission from the mobile station, reception of down control instruction from the mobile station can be frequently failed for small transmission power of the down control instruction. Accordingly, it becomes impossible maintain the down transmission powers of respective base stations equal to each other.

Therefore, during execution of the soft hand-over, a transmission power control method in the cellular communication system, in which substantially equal power can be transmitted from respective each base station even if error is caused in reception of the down control instruction in respective base stations, and whereby high channel capacity can be attained, has been proposed in Japanese Unexamined Patent Publication No. Heisei 11-340910.

FIG. 6 schematically shows the construction of the cellular communication system. In FIG. 6, service area is divided into first and second cells 11 and 12. In the first and second cells 11 and 12, a first base station (#1) 21 and a second base station (#2) 22 are respectively arranged. Also, first and second mobile stations 61 and 62 are present in the first and second cells 11 and 12. The first and second base stations 21 and 22 are connected to a common control station 71. The common control station 71 is connected to a communication network (not shown) constituted of other control station. It should be noted that while not illustrated, the cellular communication system includes other large number of base stations, and in each cell, large number of mobile stations are present.

The first and second base stations 21 and 22 transmit first and second pilot signals 31 and 32 at respectively given transmission power. Each mobile station 61, 62 has SIR (a ratio of desired wave and an interference power) measuring equipment for measuring a power of the pilot signal for respectively measuring reception power of the first and second pilot signals 31 and 32. The mobile station switches the measuring equipment of the pilot signal in a short period per slot (time slot) as shown in FIG. 7 and measures the pilot signals of a plurality of base station once per frame. In the example of FIG. 7, six slots are present within one frame and permit measurement of the pilot signals from the six base stations at the maximum. In FIG. 6, the reference numerals 41, 41a, 41b, 42 denote signals in downlink and 51, 52 denote signals in uplink.

Next, discussion will be given for the transmission power control for downlink in the cellular communication system shown in FIG. 6 with reference to FIG. 8. FIG. 8 is a flowchart showing operation of the base station for determining the down transmission power in the downlink in response to the down control instruction from the mobile station during soft hand-over. Here, the down transmission power P is expressed by a decibel value.

When the base station initiates soft hand-over with the mobile station, if the base station in question is the primary base station which has been transmitting to the mobile station before, the down transmission power P maintains the preceding value of the transmission power to the mobile station. On the other hand, if the base station is an auxiliary base station newly starting transmission to the mobile station, the down transmission power P is set at an initial value P0. The primary station and the auxiliary station are notified a frame number to initiate soft hand-over from the control station 71. The initial value P0 may be an arbitrary value falling within a control range of the down transmission power.

At first, when a transmission power balance control message between a plurality of base stations arrives from the control station 71, the base station resets a frame counter I=0 (step S201). The frame counter I is incremented by 1 per frame (step S202). Here, the down control instruction (TPC: Transmission Power Control) is notified from the mobile station at a given interval. When the newly notified down control instruction is present (step S203) and the down control instruction designates increasing of the power (step S204), the down transmission power P is increased for a predetermined value ΔP (step S205), and when the down control instruction designates decreasing of the power, the transmission power P in the downlink is decreased for the predetermined value ΔP (step S206).

The foregoing processes S203 to S206 are repeated for frame number Nperiod as a predetermined balance adjusting period. After expiration of the predetermined balance adjusting period (step S207), namely when I=Nperiod is established, a difference (C−P) between a predetermined reference power (referred to as target value or reference value) C and the down transmission power P before updating, is multiplied with a coefficient (1−r) to integrate the down transmission power P (step S208).

$$P=P+(1-r)(C-P)$$

The coefficient r is a predetermined value within a range greater than or equal to 0 and less than 1. On the other hand, C is an intermediate power between the maximum power Pmax and the minimum power Pmin of the transmission power P.

If the updated transmission power is greater than the maximum power Pmax, the down transmission power P is set at the maximum power Pmax (steps S209, S210). When the updated transmission power P is smaller than the minimum power Pmin, the down transmission power P is set at the minimum power Pmin (steps S211, S212). Then, the process is repeated from the step S202.

In this method, upon timing of initiation of the soft hand-over, since the initial values of the down transmission power of the primary base station and the auxiliary base station are different, there is a difference |P1−P2| between the down transmission power P1 of the primary base station and the down transmission power P2 of the auxiliary base station. On the other hand, upon failure of reception of the down control instruction in one or more base stations, the difference |P1−P2| of these transmission powers P1 and P2 can be increased. However, in a portion of control through steps S203 to S206, namely a portion for increasing and decreasing the down transmission power by the down control instruction from the mobile station, respective base stations receive the same down control instruction. Therefore, respective base stations do not fail reception of the down control instruction, the down transmission power P1 and P2 are increased or decreased in similar manner so as not to vary the difference |P1−P2| of these down transmission powers P1 and P2.

On the other hand, at the same time, per frame number of I=Nperiod, the primary base station and the auxiliary base station simultaneously update the down transmission powers P1 and P2 as P1+(1−r)(C−P1), P2+(1−r)(C−P2). Therefore, the difference |P1−P2| of the down transmission powers P1 and P2 becomes r|P1−P2|. Thus, the difference |P1−P2| of the down transmission power becomes r times per the period Nperiod. Since the coefficient r is smaller than 1, the difference of the control amount is decreased in geometric manner to be converged to 0 unless the difference |P1−P2| of the down transmission powers is increased due to reception error of the new down control instruction. On the other hand, even if the difference |P1−P2| of the down transmission power is increased due to occurrence of reception error of the new down control instruction, the difference |P1−P2| can be decreased. Accordingly, even by failure of reception of the down control instruction, the transmission powers Pi (i=1, 2) in the downlink can be adjusted to substantially equal value between the base stations without direct exchange of information concerning the down transmission power between the base stations.

Namely, after increasing or decreasing the down transmission power by the control at steps S203 to S206, the difference of the down transmission power of a plurality of base stations can be decreased (balance adjustment), and thus the down transmission power is updated to be closer to the reference power C determined in common for a plurality of base stations.

As set forth above, during execution of the soft hand-over by the mobile station, up control instruction of the transmission power control of the uplink is transmitted at substantially equal power between the base stations from each base station to the mobile station. Therefore, when the propagation losses from respective base stations to the mobile stations are substantially the same, when the propagation loss in the uplink can be minimum in any base station, all up control instructions can be received in the mobile station. Accordingly, the mobile station can control the up transmission power so that the desired wave power will not become excessive for any base station.

On the other hand, during execution of the soft hand-over, even if large and small relationship of the propagation losses from the mobile station and respective base stations is switched at high speed due to fading fluctuation or the like, owing to diversity effect to maintain the reception quality substantially constant, the reception quality in the mobile station can be further improved. By controlling the up transmission power so that the desired wave power will not become excessive, channel capacity of the uplink can be increased. On the other hand, if the reception quality in the mobile station can be improved by diversity effect, the channel capacity of the downlink at constant reception quality, can be increased.

As set forth above, in each base station, the transmission power is decreased for an adjusting amount in the balance adjusting period for the transmission power. The adjusting amount is derived as a predetermined ratio of the difference between the transmission power at starting timing of the adjusting period and the reference value C. This manner is illustrated in FIG. 9A. In the drawings of FIGS. 9A and 9B, Pbali (i=1, 2) is the power amount to be adjusted, and T1, T2 and T3 are adjusting timings. It should be noted that the drawing shows the width of Pbali with taking r=0.

Since the transmission power in each base station is increased or decreased according to the same transmission power control instruction (TPC bit) from the mobile station, if reception error is not contained in the transmission power control instruction, the transmission power of the base station can be increased or decreased in similar manner. At this time, if the start timing of the adjusting period is the same timing at respective base stations, when the transmission power of one of two base stations is large (P1>P2), the difference Pbal between the transmission power at the start timing of the adjusting period and the reference value C is also large in comparison with that of other base station (Pbal1>Pbal2), the transmission power (P1) of one of two base stations is decreased significantly during the adjusting period. As set forth, the base station having large transmission power is significantly decreased the transmission power to reduce the difference of the transmission power between the base stations to effect balance adjustment.

However, as shown in FIG. 9B, when the start timing of the adjusting period is difference between the base stations such as T1 and T1', since the transmission power according to the transmission power control instruction is constantly varied, if the transmission power of one of two base stations becomes greater than the other base station (P1>P2), the adjustment start timing T1 of the former base station is a moment where the transmission power is relatively small, and the adjustment start timing of later base station is a moment where the transmission power is relatively large, the difference between the transmission power at start timing of the adjusting period and the reference C becomes large in the later base station than the former base station (Pbal1<Pbal2) to significantly reduce the transmission power of the adjusting period. Therefore, the difference of the transmission powers of the base stations becomes large to cause difficulty in establishing balance of the power. As a result, equalization of the transmission powers between the base stations cannot be achieved to decrease channel capacity.

As set forth above, the phenomenon where the start timings of the adjusting periods are different such as T1 and T1', is caused by the fluctuation of arrival timings of the control messages for transmission power balance adjustment to respective base stations 21 and 22 from the control station 71 due to fluctuation of transmission delay between the control station and the base station. The reception timings of the control messages for conventional power balance adjustment shown in FIG. 2A is shown in the case where the reception timings are different between the base stations. In FIG. 2A, Nperiod=2 is taken as balance adjusting period and eight frame number of 0 to 7 are taken to repeat. As set forth above, in the prior art, a difference of the reception timings of the power balance control messages is constantly continued subsequently. Therefore, calculation timings of Pbal between the base stations are shifted constantly. As shown in FIG. 9B, reversal of Pbal1 and Pbal2 can be caused.

BRIEF SUMMARY OF THE INVENTION

It is an object of the present invention to provide a transmission power control system, a method therefor, a base station and a control station, and a storage medium recording a control program therefor, which can establish synchronization by matching adjustment start timings while repeating adjustment periods even when start timings of transmission power balance adjustment are different due to fluctuation of transmission delay of control message from the control station to base station, and can increase circuit capacity by establishing balance of transmission powers between the base stations.

According to the first aspect of the present invention, a transmission power control system in a cellular communication system including a plurality of cells, a plurality of base stations respectively arranged in respective of the plurality of cells, mobile stations located within the cells, and control station provided in common for the plurality of base stations and transmitting control instruction for balance adjustment of transmission power to respective of the mobile stations from the base stations, wherein the base station comprises control means for controlling initiation of a balance adjustment period for performing the balance adjustment from a frame number determined on the basis of frame number of the balance adjustment period.

In the preferred construction, assuming that a frame number of transmission frame to the mobile station is CFN and the balance adjustment period is Nperiod frame, the control means is in responsive to reception of the control instruction to perform initiation control of the balance adjustment period from the frame of the frame number CFN to be mod(CFN, m×Nperiod)=L (wherein, m is natural number, L is 0 or natural number smaller than m×Nperiod common to all base stations).

On the other hand, assuming that a frame number of transmission frame to the mobile station is CFN and the balance adjustment period is Nperiod frame, the control means is responsive to reception of the control instruction to perform initiation control of the balance adjustment period from a frame where a number at the first digit as expressing the CFN by m×Nperiod base number (wherein, m is natural number) becomes a predetermined value.

Furthermore, assuming that a frame number of transmission frame to the mobile station is CFN and the balance adjustment period is Nperiod frame, the control means is responsive to reception of the control instruction to perform initiation control of the balance adjustment period from a frame where the CFN becomes m×Nperiod+L (wherein m is 0 or natural number and L is 0 or natural number common to all base stations.

Also, the control station may include means for selecting the Nperiod as a value satisfying a relationship of k×Nperiod=CFNmax (k is integer) assuming that a frame number of transmission frame to the mobile station is CFN, the balance adjustment period is Nperiod frame, minimum value of the CFN is 1, maximum value is CFNmax or minimum value is 0 and maximum value is CFNmax−1, and control means of each of the base station may initiate control of the balance adjustment period from a frame to be m×Nperiod+L (wherein m is 0 or natural number and L is 0 or natural number common to all base stations).

Also, assuming that a frame number of transmission frame to the mobile station is CFN, the balance adjustment period is Nperiod frame, the control means selects the Nperiod as a value satisfying a relationship of k×Nperiod=CFNmax (k is integer) when minimum value of the CFN is 1, maximum value is CFNmax or minimum value is 0 and maximum value is CFNmax−1, to initiate control of the balance adjustment period from a frame to be m×Nperiod+L (wherein m is 0 or natural number and L is 0 or natural number common to all base stations). The control means may set an adjustment amount in the balance adjustment at a value of predetermined ratio to a difference between the transmission power upon initiation of the balance adjustment period and a reference value.

Furthermore, assuming that the CFN is incremented by one in every frame to be reset to 0 when the CFN exceeds a predetermined number, the control means is responsive to reception of the control instruction to control the balance adjustment starting at a frame with CFN modulo Nperiod equal to 0, and repeating for every Nperiod frame, and restarting at a frame with CFN=0.

According to the second aspect of the present invention, a transmission power control method in a cellular communication system including a plurality of cells, a plurality of base stations respectively arranged in respective of the plurality of cells, mobile stations located within the cells, and control station provided in common for the plurality of base stations and transmitting control instruction for balance adjustment of transmission power to respective of the mobile stations from the base stations, wherein the method comprises a control step of controlling initiation of a balance adjustment period for performing the balance adjustment from a frame number determined on the basis of frame number of the balance adjustment period, in each base station.

Then, assuming that a frame number of transmission frame to the mobile station is CFN and the balance adjustment period is Nperiod frame, the control step includes a step of initiating control of the balance adjustment period from the frame of the frame number CFN to be mod(CFN, m×Nperiod)=L (wherein, m is natural number, L is or natural number smaller than m×Nperiod common to all base stations) in response to reception of the control instruction.

Also, assuming that a frame number of transmission frame to the mobile station is CFN and the balance adjustment period is Nperiod frame, the control step is responsive to reception of the control instruction to perform initiation control of the balance adjustment period from a frame where a number at the first digit as expressing the CFN by m×Nperiod base number (wherein, m is natural number) becomes a predetermined value.

Furthermore, assuming that a frame number of transmission frame to the mobile station is CFN and the balance adjustment period is Nperiod frame, the control step includes a step responsive to reception of the control instruction to perform initiation control of the balance adjustment period from a frame where the CFN becomes m×Nperiod+L (wherein m is 0 or natural number and L is 0 or natural number common to all base stations.

The control station performs a step of selecting the Nperiod as a value satisfying a relationship of k×Nperiod=CFNmax (k is integer) assuming that a frame number of transmission frame to the mobile station is CFN, the balance adjustment period is Nperiod frame, minimum value of the CFN is 1, maximum value is CFNmax or minimum value is 0 and maximum value is CFNmax−1, and control step in each of the base station initiate control of the balance adjustment period from a frame to be m×Nperiod+L (wherein m is 0 or natural number and L is 0 or natural number common to all base stations).

On the other hand, assuming that a frame number of transmission frame to the mobile station is CFN, the balance adjustment period is Nperiod frame, the control step selects the Nperiod as a value satisfying a relationship of k×Nperiod=CFNmax (k is integer) when minimum value of the CFN is 1, maximum value is CFNmax or minimum value is 0 and maximum value is CFNmax−1, to initiate control of the balance adjustment period from a frame to be m×Nperiod+L (wherein m is 0 or natural number and L is 0 or natural number common to all base stations). The control step sets an adjustment amount in the balance adjustment at a value of predetermined ratio to a difference between the transmission power upon initiation of the balance adjustment period and a reference value.

Also, assuming that the CFN is incremented by one in every frame to be reset to 0 when the CFN exceeds a predetermined number, the control step is responsive to reception of the control instruction to control the balance adjustment starting at a frame with CFN modulo Nperiod equal to 0, and repeating for every Nperiod frame, and restarting at a frame with CFN=0.

According to the third aspect of the present invention, a base station in a cellular communication system including a plurality of cells, a plurality of the base stations respectively arranged in respective of the plurality of cells, mobile stations located within the cells, and control station provided in common for the plurality of base stations and transmitting control instruction for balance adjustment of transmission power to respective of the mobile stations from the base stations, the base station comprises: control means for controlling initiation of a balance adjustment period for performing the balance adjustment from a frame number determined on the basis of frame number of the balance adjustment period.

Also, assuming that a frame number of transmission frame to the mobile station is CFN and the balance adjustment period is Nperiod frame, the control means initiation control of the balance adjustment period from the frame of the frame number CFN to be mod(CFN, m×Nperiod)=L (wherein, m is natural number, L is or natural number smaller than m×Nperiod common to all base stations).

Furthermore, assuming that a frame number of transmission frame to the mobile station is CFN and the balance adjustment period is Nperiod frame, the control means is responsive to reception of the control instruction to perform initiation control of the balance adjustment period from a frame where a number at the first digit as expressing the CFN by m×Nperiod base number (wherein, m is natural number) becomes a predetermined value.

Furthermore, assuming that a frame number of transmission frame to the mobile station is CFN and the balance adjustment period is Nperiod frame, the control means is responsive to reception of the control instruction to perform initiation control of the balance adjustment period from a frame where the CFN becomes m×Nperiod+L (wherein m is 0 or natural number and L is 0 or natural number common to all base stations.

Assuming that a frame number of transmission frame to the mobile station is CFN and the balance adjustment period is Nperiod frame, the control means resumes the balance adjustment period from a frame to be m×Nperiod+L when the frame number is varied from the maximum value to a minimum value or from the minimum value to the maximum value in discontinuous manner.

Also, assuming that a frame number of transmission frame to the mobile station is CFN, the balance adjustment period is Nperiod frame, the control means selects the Nperiod as a value satisfying a relationship of k×Nperiod=CFNmax (k is integer) when minimum value of the CFN is 1, maximum value is CFNmax or minimum value is 0 and maximum value is CFNmax−1, to initiate control of the balance adjustment period from a frame to be m×Nperiod+L (wherein m is 0 or natural number and L is 0 or natural number common to all base stations). The control means sets an adjustment amount in the balance adjustment at a value of predetermined ratio to a difference between the transmission power upon initiation of the balance adjustment period and a reference value.

Furthermore, assuming that the CFN is incremented by one in every frame to be reset to 0 when the CFN exceeds a predetermined number, the control means is responsive to reception of the control instruction to control the balance adjustment starting at a frame with CFN modulo Nperiod equal to 0, and repeating for every Nperiod frame, and restarting at a frame with CFN=0.

According to the fourth aspect of the invention, a control station in a cellular communication system including a plurality of cells, a plurality of base stations respectively arranged in respective of the plurality of cells, mobile stations located within the cells, and control station provided in common for the plurality of base stations and transmitting control instruction for balance adjustment of transmission power to respective of the mobile stations from the base stations, each of the base station initiate control of a balance adjustment period from a frame to be m×Nperiod+L (wherein m is 0 or natural number and L is 0 or natural number common to all base stations, Nperiod is a period for performing the balance adjustment), the control station comprising means for selecting the Nperiod as a value satisfying a relationship of k×Nperiod=CFNmax (k is integer) assuming that a frame number of transmission frame to the mobile station is CFN, the balance adjustment period is Nperiod frame, minimum value of the CFN is 1, maximum value is CFNmax or minimum value is 0 and maximum value is CFNmax−1.

According to the fifth aspect of the present invention, a storage medium storing a transmission power control method in a cellular communication system including a plurality of cells, a plurality of base stations respectively arranged in respective of the plurality of cells, mobile stations located within the cells, and control station provided in common for the plurality of base stations and transmitting control instruction for balance adjustment of transmission power to respective of the mobile stations from the base stations, wherein the control program comprises a control step of controlling initiation of a balance adjustment period for performing the balance adjustment from a frame number determined on the basis of frame number of the balance adjustment period, in each base station.

According to the sixth aspect of the present invention, a storage medium storing a transmission power control method in a cellular communication system including a plurality of cells, a plurality of base stations respectively arranged in respective of the plurality of cells, mobile stations located within the cells, and control station provided in common for the plurality of base stations and transmitting control instruction for balance adjustment of transmission power to respective of the mobile stations from the base stations, each of the base station initiate control of a balance adjustment period from a frame to be m×Nperiod+L (wherein m is 0 or natural number and L is 0 or natural number common to all base stations, Nperiod is a period for performing the balance adjustment), the control program comprising step of selecting the Nperiod as a value satisfying a relationship of k×Nperiod=CFNmax (k is integer) assuming that a frame number of transmission frame to the mobile station is CFN, the balance adjustment period is Nperiod frame, minimum value of the CFN is 1, maximum value is CFNmax or minimum value is 0 and maximum value is CFNmax−1.

In the operation, upon soft hand-over of certain mobile station with a plurality of base stations, when balance adjustment of the transmission power from a plurality of base stations to the mobile station, balance adjustment period for performing balance adjustment in each base station is initiated at the frame number determined on the basis of number of frames in the balance adjustment period. By this, even when the reception timing of the balance control message from the control station is shifted due to fluctuation of transmission delay, synchronization of balance calculation timing for balance adjustment can be established between the base stations during repletion of balance adjustment period to enable accurate balance of the transmission power between the base stations.

On the other hand, when the balance control message is received in each base station before and after discontinuous variation of the frame number of the transmission frames from the maximum value to the minimum value (or from the minimum value to the maximum value), timing of balance adjustment can be shifted due to relationship between the period of the balance adjustment and total number of frames. However, by resuming balance adjustment period from the frame defined by the same rule as the rule determining the frame initiating the balance adjustment period, the frame number to be candidate of initiation of the balance adjustment period is held unchanged even when the frame number is repeated returning from the maximum value to the minimum value. Accordingly, synchronization is established between the base stations in the balance calculation timing, balance of transmission power can be accurately established between the base stations.

On the other hand, a frame number of transmission frame to the mobile station is CFN, the balance adjustment period is Nperiod frame, by selecting the Nperiod as a value satisfying a relationship of k×Nperiod=CFNmax (k is integer), the frame number to be candidate of initiation of the balance adjustment period is held unchanged even when the balance control message is received in each base station before and after discontinuous variation of the frame number of the transmission frames from the maximum value to the minimum value (or from the minimum value to the maximum value). Accordingly, synchronization is established between the base stations in the balance calculation timing, balance of transmission power can be accurately established between the base stations.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only. In the drawings:

FIG. 3 is a flowchart showing one embodiment of operation of the base station according to the present invention, which is illustrated for the case where CFN max is a integer multiple of Nperiod;

FIG. 5 is a flowchart showing another embodiment of operation of the base station according to the present invention, which is illustrated for the case where CFN max is not necessarily a integer multiple of Nperiod;

FIG. 6 is an illustration showing a system construction to which the present invention is applied;

FIG. 7 is a chart showing a frame structure in the present invention;

FIG. 8 is a flowchart showing operation of the base station in the conventional system; and FIGS. 9A and 9B are charts showing the cases where satisfactory balance adjustment of the transmission power cannot be achieved when the power balance control message from control station reaches respective base stations at different timing due to fluctuation of transmission delay.

DETAILED DESCRIPTION OF THE INVENTION

Figure 1:
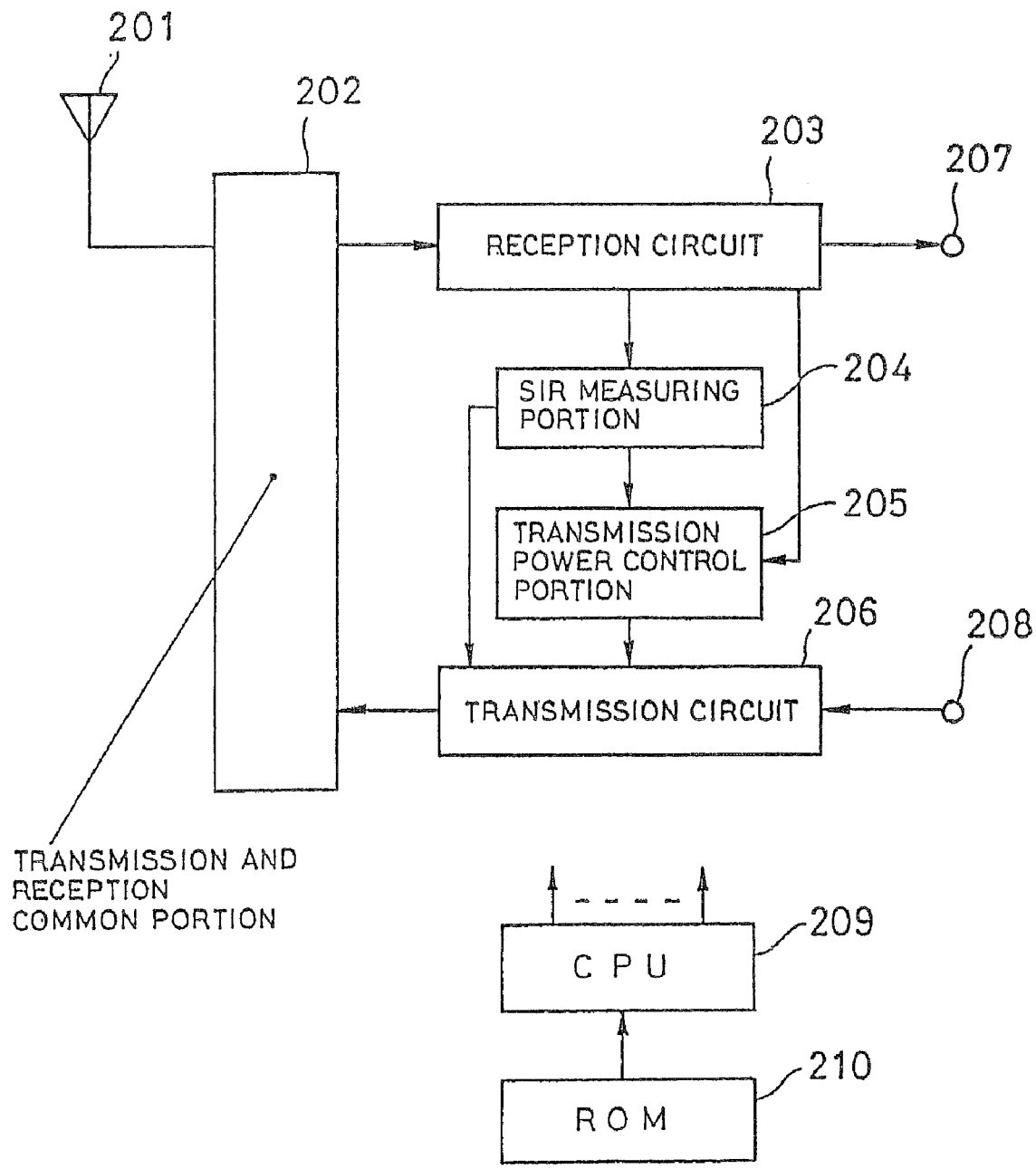
FIG. 1 is a schematic block diagram showing a construction of an embodiment of a base station according to the present invention.

The present invention will be discussed hereinafter in detail in terms of the preferred embodiment of the present invention with reference to the accompanying drawings. In the following descriptions numerous specific details are set forth in order to provide a thorough understanding of the present invention. It will be obvious, however, to those skilled in the art that the present invention may be practiced without these specific details FIG. 1 is a schematic block diagram showing a construction of the preferred embodiment of a base station according to the present invention. It should be noted that a system construction is the same as that illustrated in FIG. 6. On the other hand, a frame structure of downlink from the first base station (#1) 21 and the second base station (#2) 22 to the mobile station 51 is the same as the example shown in FIG. 7. Between the base stations, frame number to be transmitted at the same time is the same.

Referring to FIG. 1, the base station includes an antenna 201, a transmission and reception common portion 202, a reception circuit 203 performing reception process of a received signal and outputting the received signal to a terminal 207, a SIR measuring portion 204 performing SIR measurement of downlink, a transmission power control portion 205 performing control of a transmission power with reference to the result of SIR measurement or the like, and a transmission circuit 206 superimposing transmitting signal from a terminal 208 and SIR measurement result signal and controlling amplification depending upon control from the transmission power control portion 205. On the other hand, in order to perform operation control for respective portions, CPU (control unit) 209 and read-only storage medium (ROM) 210 preliminarily storing program for operation control of CPU are included.

The present invention prevents occurrence of the transmission powers of the base stations falling out of balance for increasing of difference therebetween due to shifting of timings, such as T1 and T1' of the power balance control messages from the control station 71 at the first base station #1 and the second base station #2, as shown in FIG. 9B. Therefore, as shown in FIG. 2B, the adjustment start timings of power balance between the base stations become the same to establish synchronization with each other.

Figure 2A:
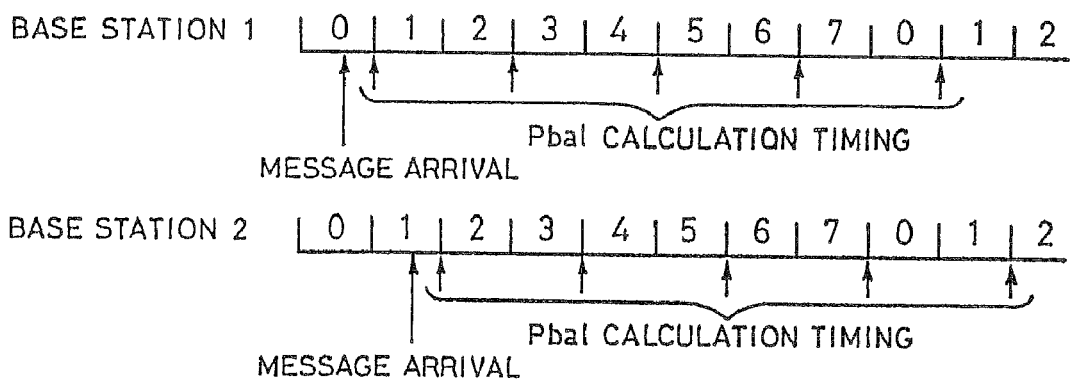
FIGS. 2A and 2B are timing charts showing calculation timing of a transmission power balance according to the present invention, shown as comparison with the prior art.
Figure 2B:
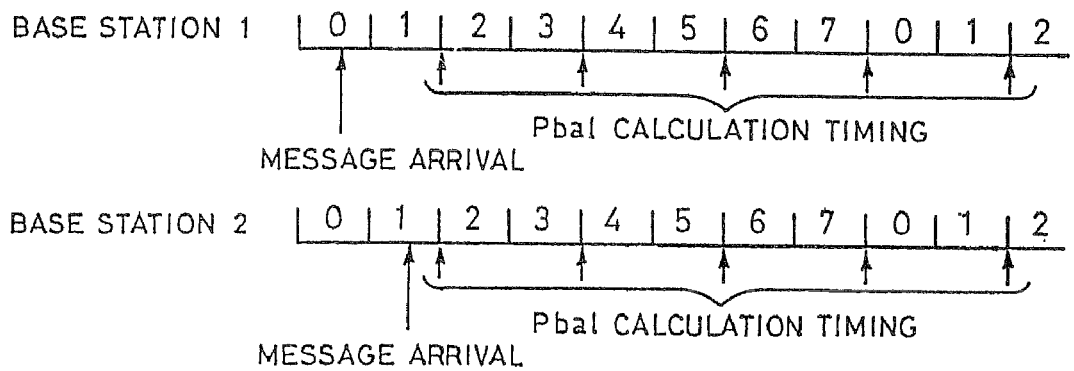

In the example shown in FIG. 2B, there is shown an example where the message is consisted of eight frames of frame numbers CFN of 0 to 7 (total number of the frame (number) is CFNmax, CFNmax−1=7), the message of eight frames is repeated, and the adjusting period is set as Nperiod=2.

Generally expressing, three modes are considered. At first, in the first mode, balance adjustment period is controlled to start at a frame of the frame number CFN which is expressed by:

$$\mathrm{mod}(CFN, m \times N\mathrm{period})=L$$

wherein m is natural number, L is 0 or natural number smaller than Nperiod and common to all base stations. Namely, at the frame of the frame number to have remainder "L" as dividing CFN by (m×Nperiod), balance adjustment is initiated. Subsequently, balance adjustment is performed at every Nperiod. In the example of FIG. 2B, it corresponds to m=1 and L=0. In FIGS. 2A and 2B, a calculation timing of Pbal is shown as leading end of the frame. However, in practice, the Pbal calculation timing may be a predetermined timing (e.g. (S)th slot) of the frame.

As second mode, when the frame number CFN is expressed by m×Nperiod base number (m is natural number), balance adjustment is initiated from the frame where the number of the first digit becomes a predetermined value. Subsequently, balance adjustment is performed at every Nperiod. In the example shown in FIG. 2B, this corresponds to the case where m=1 and the predetermined value=0.

As the third mode, the balance adjustment is initiated from the frame where the frame number CFN becomes m×Nperiod+L, wherein m is 0 or natural number and L is 0 or natural number common to all base stations. In the example shown in FIG. 2B, this corresponds to the case where m=1 and L=0.

FIG. 3 is a flowchart showing operation of the base station in the foregoing respective modes. In response to arrival (reception) of the power balance control message from the control station, the control operation shown in FIG. 3 is initiated. At first, a current frame number CFN is obtained (step S11), and a frame counter (not particularly shown) I is set at I=mod(CFN, Nperiod) (step S12). Then, Pbal=(1−r)(C−P) shown in FIG. 9 is reset to 0 (step S13). It should be noted that FIG. 9 is illustrated as a level where the reference value C becomes smaller than the transmission powers P1 and P2 of respective base stations. In such case, it becomes Pbal=(1−r)(P−C). However, in the shown embodiment discussion will be shown in the case where the reference value C is set to be greater than the transmission powers P1 and P2 of respective base stations.

Next, a slot counter (not particularly illustrated) J is reset to J=0 (step S14). Then, the system is placed in waiting state for TPC bit (step S15). In response to reception of the TPC bit, when the TPC bit is power increasing instruction (step S16), the transmission power P is controlled to increase for a predetermined amount S1 (step S17). Conversely, when the TPC bit is power decreasing instruction, the transmission power P is controlled to decrease for the predetermined amount S1 (step S18). When Pbal is greater than a predetermined value S2 (step S19), the transmission power P is controlled to increase for the predetermined amount S2 (step S20) and Pbal is controlled to decrease for the predetermined amount S2 (step S21).

At step S19, when Pbal is smaller than the predetermined amount S2, comparison of Pbal and −S2 is performed (step S22). If Pbal is smaller than −S2, a process of P−S2 is performed (step S23), and in conjunction therewith, Pbal is controlled to increase for the predetermined amount S2 (step S24). After steps S21 and S24 or when answer at step S22 is "NO", the slot counter is incremented by 1 (step S25).

The foregoing process of steps S15 to S25 is repeated for number of slots Nslot consisting one frame (step S26). By repeating for Nslot times to be J=Nslot, the frame counter I is incremented by 1. Then, process transit to the process for the next frame (step S28). At this time, until I becomes equal to Nperiod, the process through foregoing steps S14 to S27 is repeated.

When I=Nperiod is established, adjustment of Pbal is initiated. Namely, Pbal=(1−r)(C−P) is calculated (step S29), and resetting of the frame counter I=0 is performed (step S30). Them, process is returned to step S14 against start transmission power control from the first slot J=0 in the next frame.

Through the foregoing process, control of the transmission power of respective base stations in downlink is performed by the TPC bit in each slot, and in conjunction therewith, synchronization of initiation timing of power balance between the base stations is established with compensating error of initiation timing due to fluctuation caused by transmission delay of the power balance control message from the control station.

Figure 4:
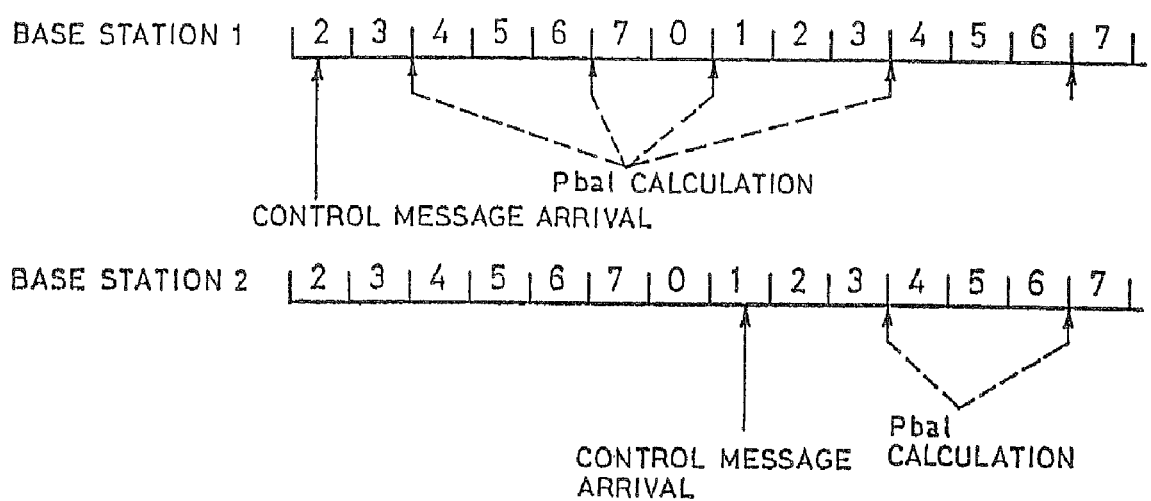
FIG. 4 is an illustration showing an example of operation when CFNmax is not integer multiple of Nperiod.

Operational flowchart shown in FIG. 3 is a flowchart which can be established only when CFNmax is integer multiple of N period in the case where the frame number CFN is 0 to maximum value (CFNmax−1) and total frame number is repeated in CFNmax. However, when CFNmax is not integer multiple of Nperiod, for example, as shown in FIG. 4, calculation timing of Pbal of the base station #1 is executed per Nperiod=3 after initiation from the frame number CFN 4. In the next frames of 0 to 7, the frame number CFN=2 becomes the calculation timing. At this time, when arrival timing of the power balance control message to the base station #2 is the frame number CFN=1, calculation timing of Pbal becomes the frame number CFN=4. Then, synchronization of calculation timings of both base stations cannot be established to cause a problem.

Therefore, in such case, in the base station #1, the frame number CFN is reset to "0" to restart calculation timing from the frame number of m×Nperiod+L (m is 0 or natural number, L is 0 or natural number common to all base stations) for establishing synchronization between the base stations #1 and #2. It should be noted that, in the example of FIG. 4, m=0 and L=1.

As set forth above, the frame number is varied from the maximum value to the minimum value (or from the minimum value to the maximum value) in discontinuous manner, synchronization can be established by restarting the balance control period from the frame determined by the same rule as the rule determining the frame starting the balance adjustment period.

In such case, operational flowchart of the base station is shown in FIG. 5. In the flowchart shown in FIG. 5, the same or equivalent steps with the flowchart shown in FIG. 3 are shown by the same reference numerals and redundant discussion for such common steps will be eliminated for avoiding redundancy of disclosure and whereby for maintaining the disclosure simple enough to facilitate clear understanding of the present invention. Therefore, the following discussion will be given mainly for portions different from FIG. 3. Next to step S27, a frame number counter CFN is provided and is incremented by 1 (step S31). Then, the value of the frame number counter is checked whether it becomes the maximum value CFNmax or not (step S32). If the result of checking is "YES", the frame number counter CFN is reset to "0" (step S33). The, process is returned to step S29.

In the discussion for FIGS. 4 and 5, there is shown the case where value of the frame number counter is ascending order, the same is applicable for the case of descending order.

In FIG. 5, Pbal is calculated based on the power value P at the end of the frame per Nperiod frame including CFN=0. On the other hand, in the flowcharts shown in FIGS. 3 and 5, Pbal is calculated as Pbal=(1−r)(C−P) for updating Pbal per calculation. However, it may be an example for integration as Pbal=Pbal+(1−r)(C−P).

By selecting a value where an integer k to establish k×Nperiod=CFNmax as Nperiod, the embodiment resetting the foregoing frame number counter CFN to "0" becomes unnecessary, as a matter of course. In this case, selecting Nperiod at a value at which an integer k satisfying k×Nperiod=CFNmax, is present, may be performed by the base station. However, such selection is typically done by the control station and is noticed to each base station. Accordingly, in each base station, by starting balance adjustment at the frame to be m×Nperiod+L, synchronization of calculation timing in both base station can be established even when the frame number CFN is varied from the maximum value to the minimum value (or conversely returning from the minimum value to the maximum value for counting down). For example when CFNmax=256, Nperiod is selected among 1, 2, 4, 8, 16, 32, 64, 128 and 256.

On the other hand, concerning operational flowchart of FIGS. 3 and 5, the process is executed by CPU 209 which reads out the program stored in the storage medium, such as ROM 210 shown in FIG. 1. While not particularly illustrated, concerning functional block diagram and operational flowchart in the control station, by preliminarily storing operation control program in the storage medium, CPU may read out the program for execution to perform operation of transmission of the transmission power balance control message and selected.

As set forth above, according to the present invention, when reception timings of the control signal are different due to fluctuation of transmission delay of the control signal from the control station to the base station, even though starting points of the first adjusting period are different, timing of subsequent balance adjustment is synchronized. By this, balance of the transmission power between the base stations can be improved to contribute for increasing of channel capacity.

Particularly, in the invention performing resumption control, synchronization of timing of balance adjustment can be established even when a value where k satisfying k×CFNmax does not present is selected as Nperiod. Therefore, Nperiod can be selected irrespective of the value of CFNmax. Therefore, in order to satisfy predetermined demanded reference for balancing the transmission power between the base stations, frequency of balance adjustment has to be greater than or equal to a predetermined frequency. However, since Nperiod can be selected irrespective of the value of CFNmax, frequency of balance adjustment can be made greater than or equal to the predetermined frequency but minimum. Therefore, process of control for establishing synchronization of timing of balance adjustment can be reduced.

On the other hand, in the present invention for selecting the value where k satisfying k×Nperiod=CFNmax, as Nperiod, resumption control becomes unnecessary even when total number of frames is limited. Therefore, process of control for establishing synchronization of timing of balance adjustment can be reduced.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A transmission power control system in a cellular communication system including a plurality of cells, a plurality of base stations respectively arranged in respective of said plurality of cells, mobile stations located within said cells, and control station provided in common for said plurality of base stations and transmitting control instruction including a balance adjustment period for balance adjustment of transmission power to respective of said mobile stations from said base stations, wherein CFN represents a frame number of a transmission frame to said mobile station and Nperiod frame represents said balance adjustment period, each base station comprises means for starting said balance adjustment from the frame of the frame number CFN to be mod (CFN, m×Nperiod)=0 (m being a natural number) in response to reception of said control instruction, means for repeating said balance adjustment every said balance adjustment period, and means for adding 1 to said CFN every frame and resetting said CFN to zero when said CFN exceeds a maximum value.

2. The method according to claim 1, further comprises a step of controlling initiation of said balance adjustment period for performing said balance adjustment from a frame number determined on the basis of frame number of the balance adjustment period.

3. A transmission power control method in a cellular communication system including a plurality of cells, a plurality of base stations respectively arranged in respective of said plurality of cells, mobile stations located within said cells, and control station provided in common for said plurality of base stations and transmitting control instruction including a balance adjustment period for balance adjustment of transmission power to respective of said mobile stations from said base stations, wherein CFN represents a frame number of a transmission frame to said mobile station and Nperiod frame represents said balance adjustment period, said method comprises a step of starting said balance adjustment from the frame of the frame number CFN to be mod(CFN, m×Nperiod)=0 (m being a natural number) in response to reception of said control instruction, a step of repeating said balance adjustment every said balance adjustment period, in each base station, and a step for adding 1 to said CFN every frame and resetting said CFN to zero when said CFN exceeds a maximum value.

4. The base station according to claim 3, further comprises means for controlling initiation of said balance adjustment period for performing said balance adjustment from a frame number determined on the basis of frame number of the balance adjustment period.

5. A base station in a cellular communication system including a plurality of cells, a plurality of base stations respectively arranged in respective of said plurality of cells, mobile stations located within said cells, and control station provided in common for said plurality of base stations and transmitting control instruction including a balance adjustment period for balance adjustment of transmission power to respective of said mobile stations from said base stations, wherein CFN represents a frame number of a transmission frame to said mobile station and Nperiod frame represents said balance adjustment period, said base station comprises means for starting said balance adjustment from the frame of the frame number CFN to be mod(CFN, m×Nperiod)=0 (m being a natural number) in response to reception of said control instruction, means for repeating said balance adjustment every said balance adjustment period, and means for adding 1 to said CFN every frame and resetting said CFN to zero when said CFN exceeds a maximum value.

6. The mobile station according to claim 5, said each base station further comprises means for controlling initiation of said balance adjustment period for performing said balance adjustment from a frame number determined on the basis of frame number of the balance adjustment period.

7. A mobile station in a cellular communication system including a plurality of cells, a plurality of base stations respectively arranged in respective of said plurality of cells, mobile stations located within said cells, and control station provided in common for said plurality of base stations and transmitting control instruction including a balance adjustment period for balance adjustment of transmission power to respective of said mobile stations from said base stations, wherein CFN represents a frame number of a transmission frame to said mobile station and Nperiod frame represents said balance adjustment period, each base station comprises means for starting said balance adjustment from the frame of the frame number CFN to be mod(CFN, m×Nperiod)=0 (m being a natural number) in response to reception of said control instruction, means for repeating said balance adjustment every said balance adjustment period, and means for adding 1 to said CFN every frame and resetting said CFN to zero when said CFN exceeds a maximum value said mobile station comprising means for transmitting a control instruction for controlling said transmission power.

8. The transmission power control system according to claim 7, said each base station further comprises means for controlling initiation of said balance adjustment period for performing said balance adjustment from a frame number determined on the basis of frame number of the balance adjustment period.

* * * * *